United States Patent
Perski

(10) Patent No.: US 6,462,657 B1
(45) Date of Patent: Oct. 8, 2002

(54) INTRUSION DETECTION APPARATUS HAVING A VIRTUAL CAPACITOR

(75) Inventor: Kurt Alan Perski, Northville, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/881,456

(22) Filed: Jun. 14, 2001

(51) Int. Cl.[7] ............................................. G08B 13/00
(52) U.S. Cl. ....................... 340/541; 340/426; 340/529; 340/552; 367/93
(58) Field of Search ................................ 340/541, 511, 340/526, 529, 530, 552, 438, 573.1, 426; 367/93, 94

(56) References Cited

U.S. PATENT DOCUMENTS

| | | | |
|---|---|---|---|
| 4,764,755 A | 8/1988 | Pedtke et al. ................ | 340/541 |
| 5,483,219 A | 1/1996 | Aoki et al. .................. | 340/426 |
| 5,677,666 A * | 10/1997 | Stallbohm .................... | 340/426 |
| 5,680,096 A | 10/1997 | Grasmann .................... | 340/426 |
| 5,682,134 A | 10/1997 | Stallbohm .................... | 340/426 |
| 5,729,193 A | 3/1998 | Grasmann et al. ........... | 340/426 |
| 5,808,544 A * | 9/1998 | Kani et al. ................... | 340/426 |
| 5,856,778 A * | 1/1999 | Kani et al. ................... | 340/426 |
| 6,157,293 A * | 12/2000 | Bonhoure .................... | 340/426 |

\* cited by examiner

*Primary Examiner*—Daniel J. Wu
*Assistant Examiner*—Phung Nguyen
(74) *Attorney, Agent, or Firm*—Tarolli, Sundheim, Covell, Tummino & Szabo L.L.P.

(57) ABSTRACT

An apparatus (10) and a method for detecting an intrusion into an area (e.g., 14) are provided. The apparatus (10) has a transmitter (30) for transmitting a signal within the area. The apparatus (10) also has a receiver (32) for receiving reflected return signals of the transmitted signal and for generating an output signal indicative of the reflected return signals received. The apparatus (10) also includes a controller (36) for analyzing the output signal. The controller includes a processor (43) for running an algorithm that simulates performance of a capacitor, which charges and discharges in response to an output signal, by increasing a virtual capacitor value when the output signal is greater than a threshold and by decreasing the virtual capacitor value when the output signal is less than the threshold.

17 Claims, 9 Drawing Sheets

INTRUSION DETECTION APPARATUS HAVING A VIRTUAL CAPACITOR

TECHNICAL FIELD

The present invention relates to an intrusion detection apparatus and a method by which the apparatus operates. More particularly, the present invention relates to an intrusion detection apparatus having a memory that simulates a capacitor and a method of operating the apparatus.

BACKGROUND OF THE INVENTION

Intrusion detection apparatuses that utilize ultrasonic signals and the Doppler principle are known. Each of these apparatuses transmits a known frequency signal and monitors the frequency of a return signal. Movement within a protected area may cause a change in the frequency of the return signal as compared to the transmitted signal. The change in frequency of the signal is known as a Doppler shift.

One known intrusion detection apparatus applies the return signal, after filtering, to the circuit shown in FIG. 10. The circuit in FIG. 10 includes a window comparator comprising first and second op-amps 1002 and 1004, respectively. The first op-amp 1002 has a reference voltage of 2.7 volts applied to the inverting input and the filtered return signal applied to the non-inverting input. The second op-amp 1004 of the window comparator has a reference voltage of 2.3 volts applied to the non-inverting input and the filtered return signal applied to the inverting input.

An output 1006 of the window comparator is attached to a current source 1008. When the filtered return signal is within the range of 2.3 to 2.7 volts, the current source 1008 is not connected to a capacitor 1010 of the circuit. However, when the filtered return signal is outside of the range of 2.3 to 2.7 volts, the current source 1008 is attached to the capacitor 1010.

When the current source 1008 is attached to the capacitor 1010, the capacitor 1010 charges. When the capacitor 1010 is not connected to the current source 1008, leakage causes the capacitor 1010 to discharge. The capacitor 1010 is attached to the non-inverting input of a third comparator 1012. A 2.5 volt reference voltage is attached to the inverted input of the third comparator 1012. When the capacitor charge reaches 2.5 volts, the output 1014 of the third comparator 1012 is maximized and an alarm is triggered.

When the circuit of FIG. 10 is used in an intrusion detection apparatus, the apparatus is not adaptable to varying conditions. For example, the reference voltages applied to the first and second op-amps 1002 and 1004 fix the range of the comparator window. Since the reference voltages are not variable, changing environmental conditions are more likely to result in false alarms.

SUMMARY OF THE INVENTION

The present invention is an apparatus for detecting an intrusion into an area. The apparatus comprises a transmitter for transmitting a signal within the area. The apparatus also comprises a receiver for receiving reflected return signals of the transmitted signal and for generating an output signal indicative of the reflected return signals received. The apparatus also includes a controller for analyzing the output signal. The controller includes a processor for running an algorithm that simulates performance of a capacitor, which charges and discharges in response to an output signal, by increasing a virtual capacitor value when the output signal is greater than a threshold and by decreasing the virtual capacitor value when the output signal is less than the threshold.

In another aspect of the invention, a method for detecting an intrusion into an area is provided. The method comprises the steps of transmitting a signal within the area; receiving reflected return signals of the transmitted signal; generating an output signal indicative of the reflected return signals received; and running an algorithm that simulates performance of a capacitor, which charges and discharges in response to an output signal, by increasing a virtual capacitor value when the output signal is greater than a threshold and by decreasing the virtual capacitor value when the output signal is less than the threshold.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF AN EXAMPLE EMBODIMENT

Figure 1:
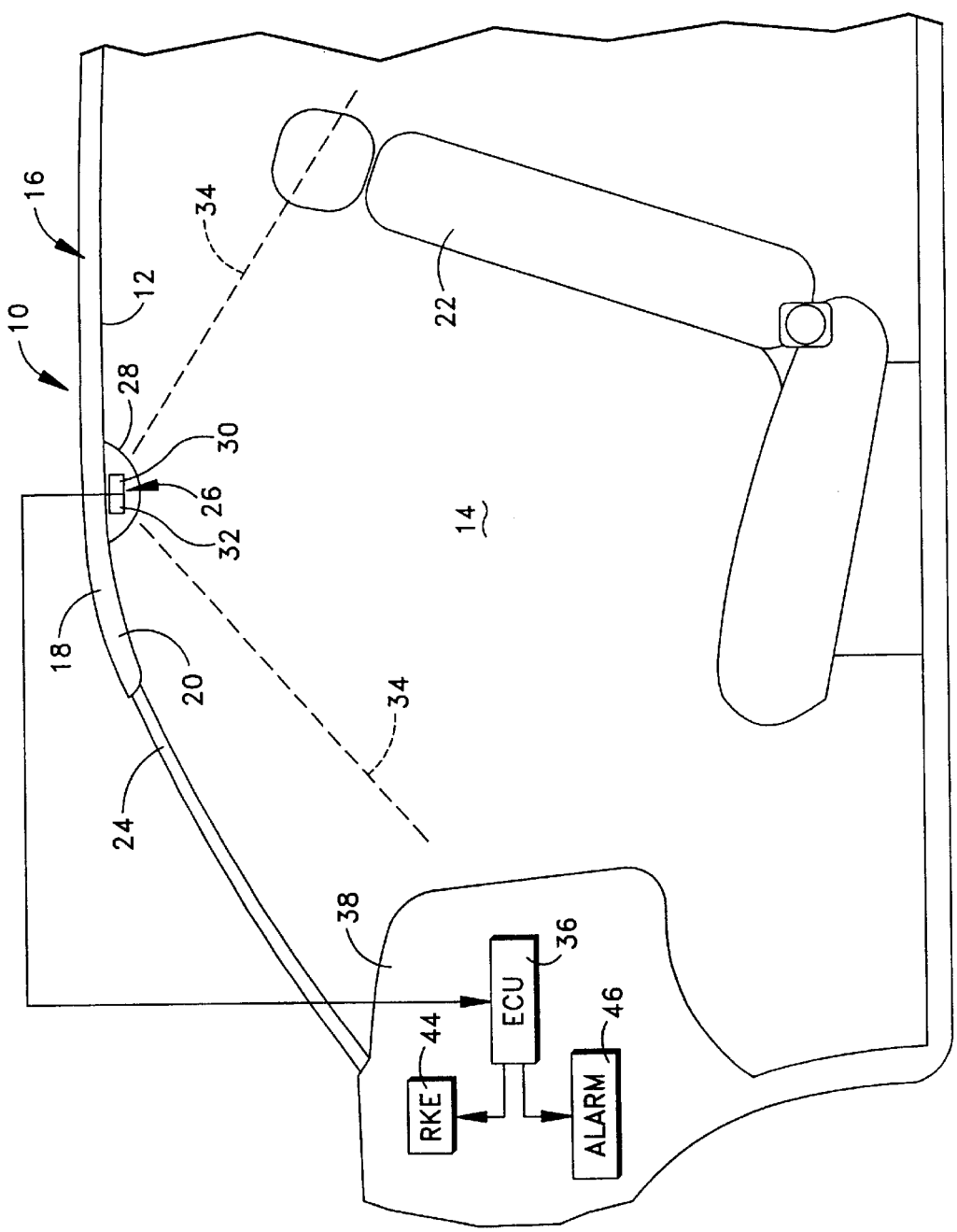
FIG. 1 is a schematic diagram of an apparatus, in accordance with the present invention, mounted on a vehicle ceiling.

FIG. 1 illustrates schematically an intrusion detection apparatus 10, in accordance with the present invention. The apparatus 10 in FIG. 1 is mounted to a ceiling 12 of a passenger compartment 14 of a vehicle 16. The ceiling 12 of the passenger compartment 14 is formed by the interior of the roof 18. Alternatively, the apparatus 10 may be mounted at some other location within the vehicle passenger compartment 14, such as on a headliner 20, between front seats 22 of the vehicle 16, or on a central portion of an upper edge of a front windshield 24. A suitable location is one that allows signals that are transmitted by the apparatus 10 to cover a significant portion of the passenger compartment 14 of the vehicle 16.

The apparatus 10 includes a transceiver 26 that is mounted in an overhead console 28. Preferably, the transceiver 26 is an ultrasonic device that transmits and receives ultrasonic signals. As an alternative to an ultrasonic transceiver 26, an infrared transceiver may be used. The transceiver 26 includes a transmitter 30 and a receiver 32.

The operating frequency of the transmitter 30 is predetermined. Preferably, the transmitter 30 transmits continuous wave ("CW") signals with a peak to peak voltage of 10 volts and an operating frequency of 40 kHz. The operating frequency of the transmitter 30 is preferably greater than the human listening range (i.e., greater than 20 kHz).

Preferably, the transmitter 30 of the transceiver 26 transmits the CW signals as beams, indicated at 34 in FIG. 1. The beams 34 are transmitted throughout the passenger compartment 14 of the vehicle 16, each of the beams 34 being directed toward a particular portion of the passenger compartment 14. The beams 34 reflect off of objects in the passenger compartment 14 of the vehicle 16. The reflected beams 34 travel throughout the passenger compartment 14.

Portions of the reflected beams 34 return to the receiver 32. As a result, the receiver 32 receives a single wave return signal that is a superposition of all the reflected beams 34 received by the receiver 32. Generally, the return signal received by the receiver 32 has the same frequency as the transmitted signal, but has a phase and amplitude that varies from the transmitted signal. The phase and amplitude of the return signal are dependent upon the phase and amplitude of the various reflected beams 34 added together at the receiver 32 to form the return signal.

The frequency, amplitude, and phase of the return signal received by the receiver 32 remains constant over time if there is no motion within the passenger compartment 14 and the temperature within the passenger compartment 14 remains constant. However, motion in the passenger compartment 14 or a change in temperature within the passenger compartment 14 alters the reflected beams 34 and, as a result, the return signal received at the receiver 32.

Motion within the passenger compartment 14 of the vehicle 16 results in a Doppler shift in the frequency of the beams 34 that are reflected off of the object in motion. A Doppler shift in the frequency of some of the reflected beams 34 alters the frequency, amplitude, and phase of the return signal received by the receiver 32.

An electronic control unit ("ECU") 36 is operatively connected to the transceiver 26. The ECU 36 is preferably located within the vehicle's instrument panel 38. The ECU 36 controls the transceiver 26 and analyzes the return signal received by the receiver 32 to determine whether the return signal is indicative of an intrusion into the passenger compartment 14 of the vehicle 16.

Figure 2:
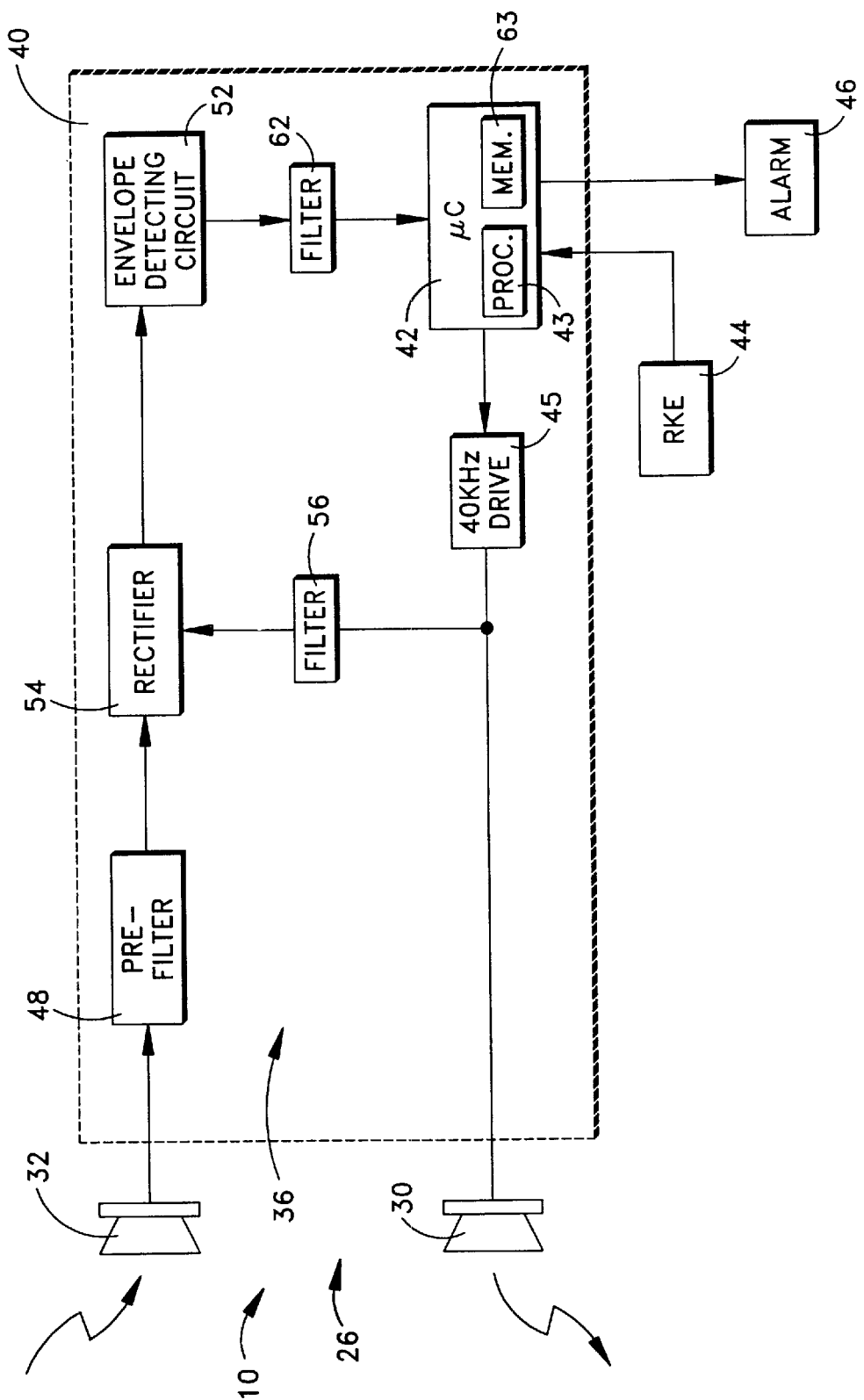
FIG. 2 is a schematic block diagram of the apparatus of FIG. 1.

As shown in FIG. 2, the ECU 36 preferably comprises a process circuit 40 and a controller 42. The process circuit 40 comprises a plurality of discrete circuits and circuit components. The controller 42 comprises a processor 43 for running a control process to determine whether the return signal is indicative of an intrusion into the passenger compartment 14 and, thus, whether an alarm condition should be triggered.

The controller 42 may also include a switching element (not shown) that is actuatable to enable and disable the apparatus 10. One method of actuating the switching element is by a remote keyless entry ("RKE") system. A receiver 44 for an RKE system is shown in FIGS. 1 and 2. The RKE system allows the vehicle operator to disable the apparatus 10 before entering the vehicle 16 and to enable the apparatus 10 upon exiting the vehicle 16.

An alarm 46 is also operatively connected to the ECU 36. Upon detection of an intrusion into the passenger compartment 14 of the vehicle 16, the controller 42 may trigger an alarm condition. The alarm 46 may be responsive to the alarm condition to sound the vehicle horn, flash the vehicle lights, disable the vehicle ignition system, or transmit an alarm signal.

An oscillating drive circuit 45 (FIG. 2) generates a CW signal at a frequency of 40 kHz that is applied to the transmitter 30 of the transceiver 26. This CW signal can be either a square wave or a sinusoidal waveform. Specifically, the oscillating drive circuit 45 generates a 40 kHz signal that drives the transmitter 30 and results in the transmitter 30 transmitting continuous wave ultrasonic signals, shown as beams 34 in FIG. 1, at 40 kHz into the passenger compartment 14 of the vehicle 16.

The beams 34 reflect off of objects in the passenger compartment 14 and portions of the reflected beams 34 return to the receiver 32. As a result, the receiver 32 receives a single wave return signal that is a superposition of all the reflected beams 34.

The receiver 32 of the transceiver 26 outputs the return signal to the ECU 36. In the ECU 36, the return signal is input into a prefilter 48 (FIG. 2) of the process circuit 40. The prefilter 48 is a bandpass filter that eliminates noise not associated with the intrusion effects to be detected by the apparatus 10. Preferably, the bandpass filter has a lower limit of 20 Hz and an upper limit of 400 Hz. The lower limit eliminates noise associated with temperature changes and other non-intrusive events that may affect the return signal. The upper limit prevents aliasing of an analog-to-digital converter ("ADC") 50 (FIG. 3) of an envelope detecting circuit 52 of the process circuit 40.

After passing through the prefilter 48, the return signal is input into a rectifier 54. The rectifier 54 is preferably a full-wave rectifier. Since the return signal is carried on a transmitted reference signal, the reference signal is used to rectify the return signal. The output of the rectifier 54 is a signal indicative of the difference in the frequency, amplitude, and phase of the return signal input into the rectifier 54 and the reference signal input into the rectifier 54.

Figure 4:
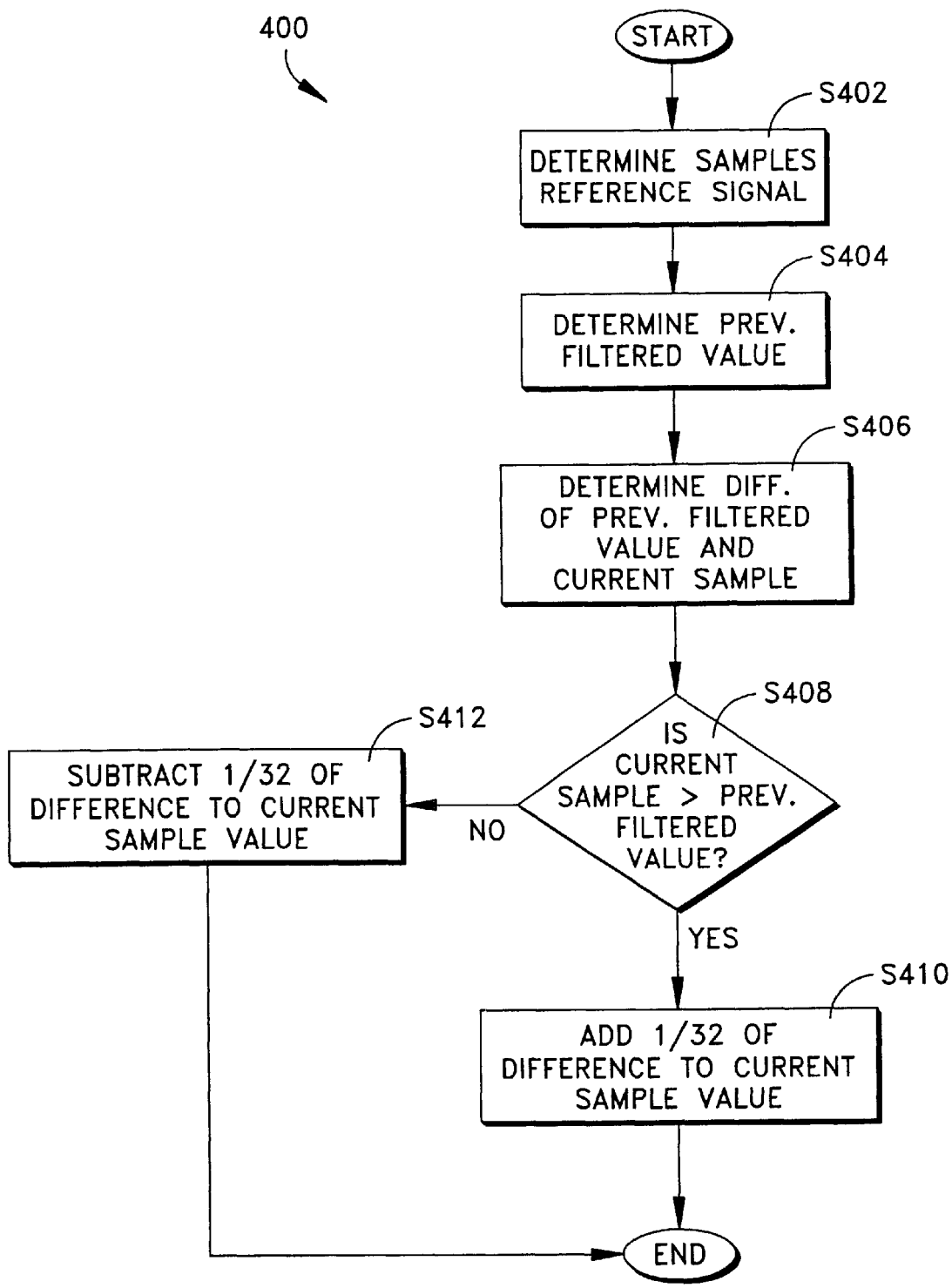
FIG. 4 is a flowchart diagram of a filtering process for a reference signal.

The reference signal is processed through a filter 56 and the filtered reference signal is input into the rectifier 54. The filtering process 400 for the reference signal is illustrated in FIG. 4. At step S402, samples of the reference signal are determined. Each sample is the value of the reference signal at a particular point in time, i.e., one sample may be taken every millisecond. Each sample is then filtered using a value of previous samples.

At step S404, a previous filtered value is determined. The previous filtered value is the filtered value for the previous sample of the reference signal. If no previous sample of the reference signal has been filtered, the previous filtered value is equal to the unfiltered value of the reference signal for the sample immediately previous to the current sample.

At step S406, the difference between the previous filtered value and the value of the current sample is determined. The process 400 then proceeds to step S408. At step S408, a determination is made as to whether the current sample value is greater than the previous filtered value. If the determination in step S408 is affirmative, the process 400 proceeds to step S410. In step S410, the current filtered value for the sample of the reference signal is determined. The current filtered value for the sample of the reference signal is $\frac{1}{32}$ of the difference determined at step S406 added to the current sample value. If the determination in step S408 is negative, the process 400 proceeds to step S412. At step S412, the current filtered value for the sample of the reference signal is $\frac{1}{32}$ of the difference determined at step S406 subtracted from the current sample value. Filter 56 results in the current filtered value of the reference signal changing exponentially.

The process 400 of FIG. 4 continues for each sample of the reference signal. The current filtered value of the reference signal becomes the previous filtered value when the next sample of the reference signal is filtered.

As shown schematically in FIG. 2, each filtered value of the reference signal is input into the rectifier 54 for full-wave rectifying the return signal. As a result, samples of the return signal having a value that is less than the filtered reference signal value are inverted and made positive by the rectifier 54.

Figure 3:
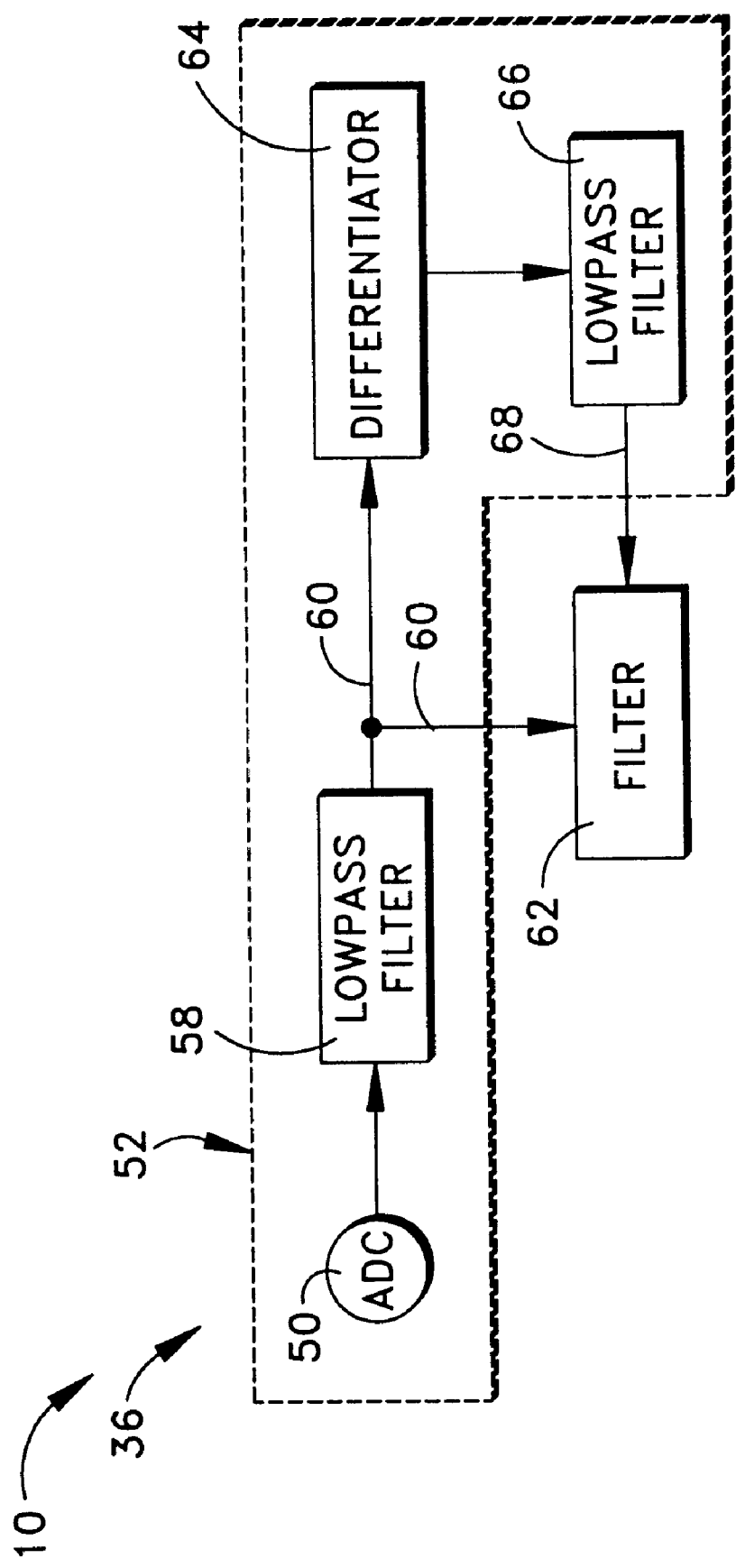
FIG. 3 is a schematic block diagram of an envelope detecting circuit.

The output signal of the rectifier 54 is input into an envelope detecting circuit 52. An example embodiment of the envelope detecting circuit 52 is illustrated in FIG. 3. Alternatively, the envelope detecting circuit could be implemented in digital form as an algorithm running on the controller 42. The envelope detecting circuit 52 determines an envelope of the output signal.

The envelope detecting circuit 52 includes the analog-to-digital converter ("ADC") 50. Preferably, the ADC 50 has a sample rate of 1 kHz. If the upper limit of prefilter 48 is set at 400 Hz, the ADC 50 should have at least an 800 Hz sample rate so that the Nyquist criteria are met. Preferably, the ADC 50 is an 8-bit converter with a range from zero to five volts. As a result, the ADC 50 will have 256 counts, ranging from zero to 255 where 19.6 millivolts equals one count.

The ADC 50 digitizes the output signal and passes the digitized output signal to a low-pass filter 58. One type of low-pass filter 58 that may be used is a recursive filter that achieves a long impulse response without having to perform a long convolution. The recursive filter removes noise jitters or spikes from the output signal.

The output signal, after being filtered by the low-pass filter 58 is indicated in FIG. 3 at 60. The output signal 60 is then input into both an intrusion signal conditioning filter 62 and a combination of a differentiator 64 and a low-pass filter 66. The combination of the differentiator 64 and the low-pass filter 66 generates a filtered derivative value 68 of the output signal. The filtered derivative value 68 of the output signal is also input into the intrusion signal conditioning filter 62.

Figure 5:
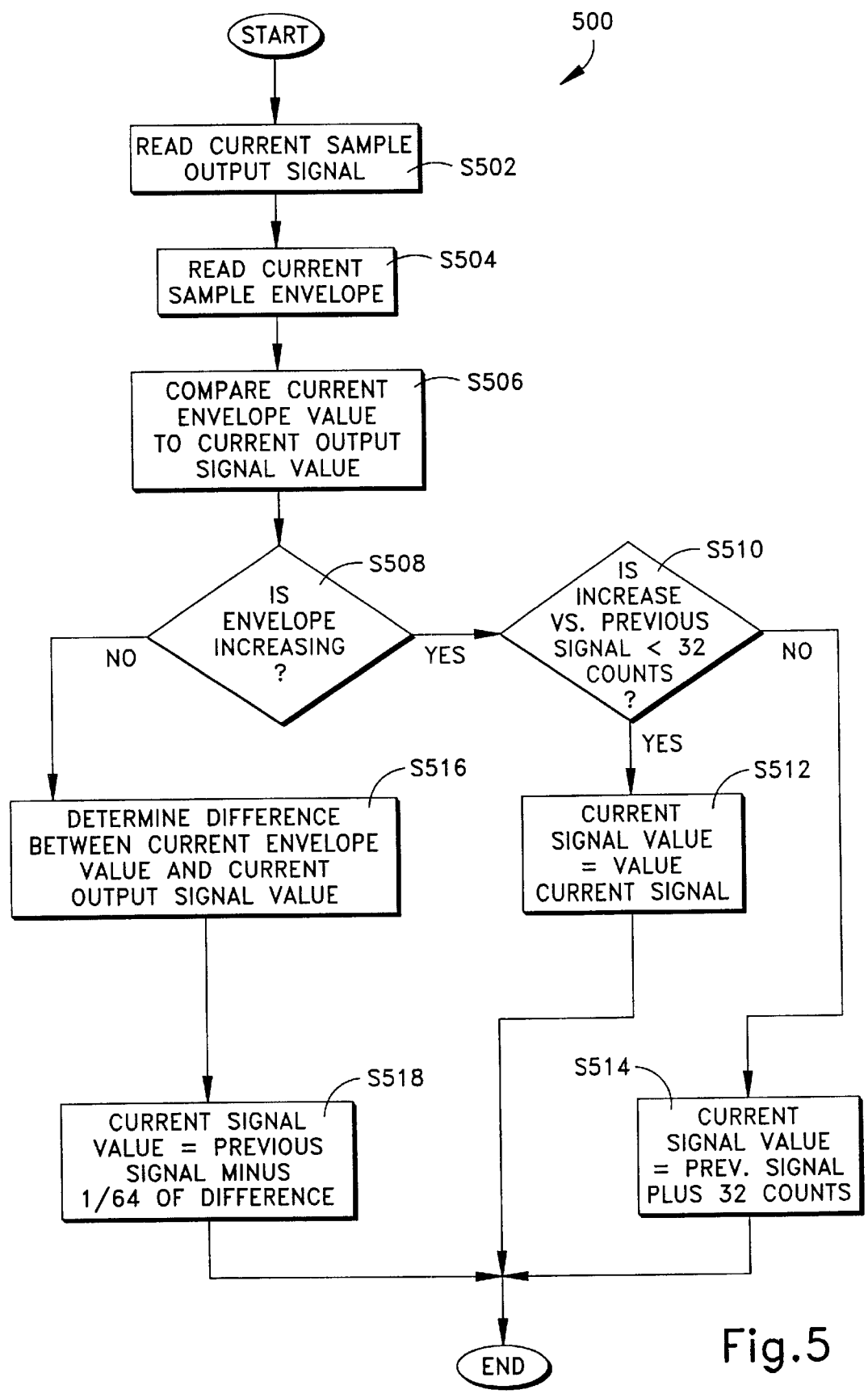
FIG. 5 is a flowchart diagram of an intrusion signal filtering process.

The filtering process 500 of the intrusion signal conditioning filter 62 is illustrated in FIG. 5. The process 500 begins at step S502 where a current sample of the output signal is read. At step S504, a current sample of the envelope, corresponding in time with the current output signal sample, is read. The process 500 then proceeds to step S506 where the current envelope value is compared to the current output signal value.

The process 500 then proceeds to step S508. In step S508, a determination is made as to whether the envelope is increasing. A comparator (not shown) may be used to compare the current envelope value to the previous envelope value to determine if the envelope is increasing or, the derivative value 68 of the output signal may be used to determine if the envelope is increasing.

If the determination in step S508 is affirmative, the process 500 proceeds to step S510. At step S510, a determination is made as to whether an increase of the current output signal value as compared to the previous output signal value is less than 32 counts. If in step S510, it is determined that the increase is less than thirty-two counts, the process 500 proceeds to step S512. At step S512, the current output signal value that is sent to the controller 42 is the actual value of the current output signal. If in step S510, it is determined that the increase is not less than thirty-two counts, the process 500 proceeds to step S514. At step S514, the current output signal value that is sent to the controller 42 is set equal to the previous output signal value plus 32 counts. Thus, when the signal value is increasing, the rise rate is limited to 32 counts per sample. This limited rise rate serves to improve noise spike rejection.

At step S508, if it is determined that the envelope is not increasing, the process 500 proceeds to step S516. At step S516, the difference between the current envelope value and the current output signal value is determined. The process 500 next proceeds to step S518. At step S518, the current output signal value that is sent to the controller 42 is set equal to the previous output signal value minus $\frac{1}{64}^{th}$ of the difference determined in step S516. When the envelope is not increasing, the intrusion signal conditioning filter 62 has an exponential effect on the output signal. By decreasing the output signal by $\frac{1}{64}$ the difference of the current envelope value and the current output signal value, the intrusion signal conditioning filter 62 assists in the detection of small motion signals by providing a longer decay time. The process 500 of FIG. 5 is repeated for each sample of the output signal.

The controller 42 receives the filtered output signal from the intrusion signal conditioning filter 62. The controller 42 includes a processor 43 that runs a control process 700 (FIG. 7) for determining if an alarm condition should be triggered. The control process 700 is an algorithm that simulates the charging and discharging of a capacitor. A memory 63 of the controller 42, called a virtual capacitor, stores a virtual capacitor value that is analogous to the charge of a capacitor.

Figure 6:
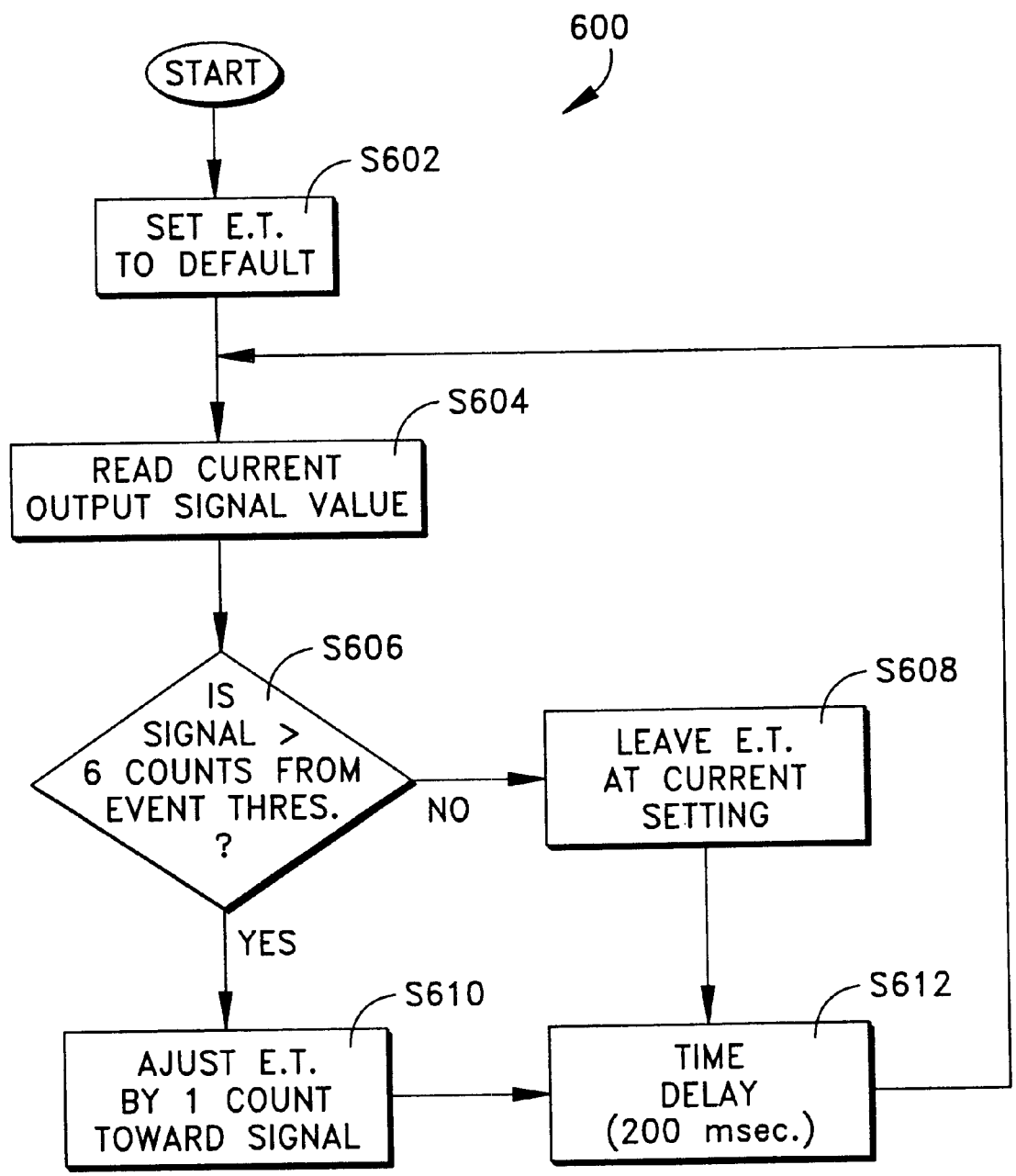
FIG. 6 is a flowchart diagram of a process for adapting the value of an event threshold.

The control process 700 requires establishing an event threshold. FIG. 6 illustrates a process 600 for determining the event threshold. The event threshold that is determined in the process 600 of FIG. 6 is adaptable over time. By adapting the event threshold over time, false alarms that may result from varying environmental noise conditions may be avoided.

The process 600 for establishing the event threshold begins at step S602 where the event threshold is set to a default level. Preferably, the default level for the event threshold is 150 counts. The process 600 then proceeds to step S604. At step S604, the value of the current output signal is read. The process 600 then proceeds to step S606. At step S606, the current output signal value is compared to the event threshold to determine whether the current output signal value is greater than six counts from the event threshold. If the determination in step S606 is negative, the event threshold is left at its current level, step S608. The process 600 then proceeds to step S612. If the determination in step S606 is affirmative, the event threshold is adjusted by one count toward the current output signal, step S610. Thus, if the current output signal is greater than the event threshold by more than six counts, the event threshold is increased by one count. If the current output signal is less than the event threshold by more than six counts, the event threshold is decreased by one count. The process 600 then proceeds to step S612. At step S612, there is a time delay of preferably 200 milliseconds. After the time delay, the process returns to step S604, and the process 600 is repeated. As a result, the level of the event threshold may be adapted by as much as five counts per second.

Figure 7:
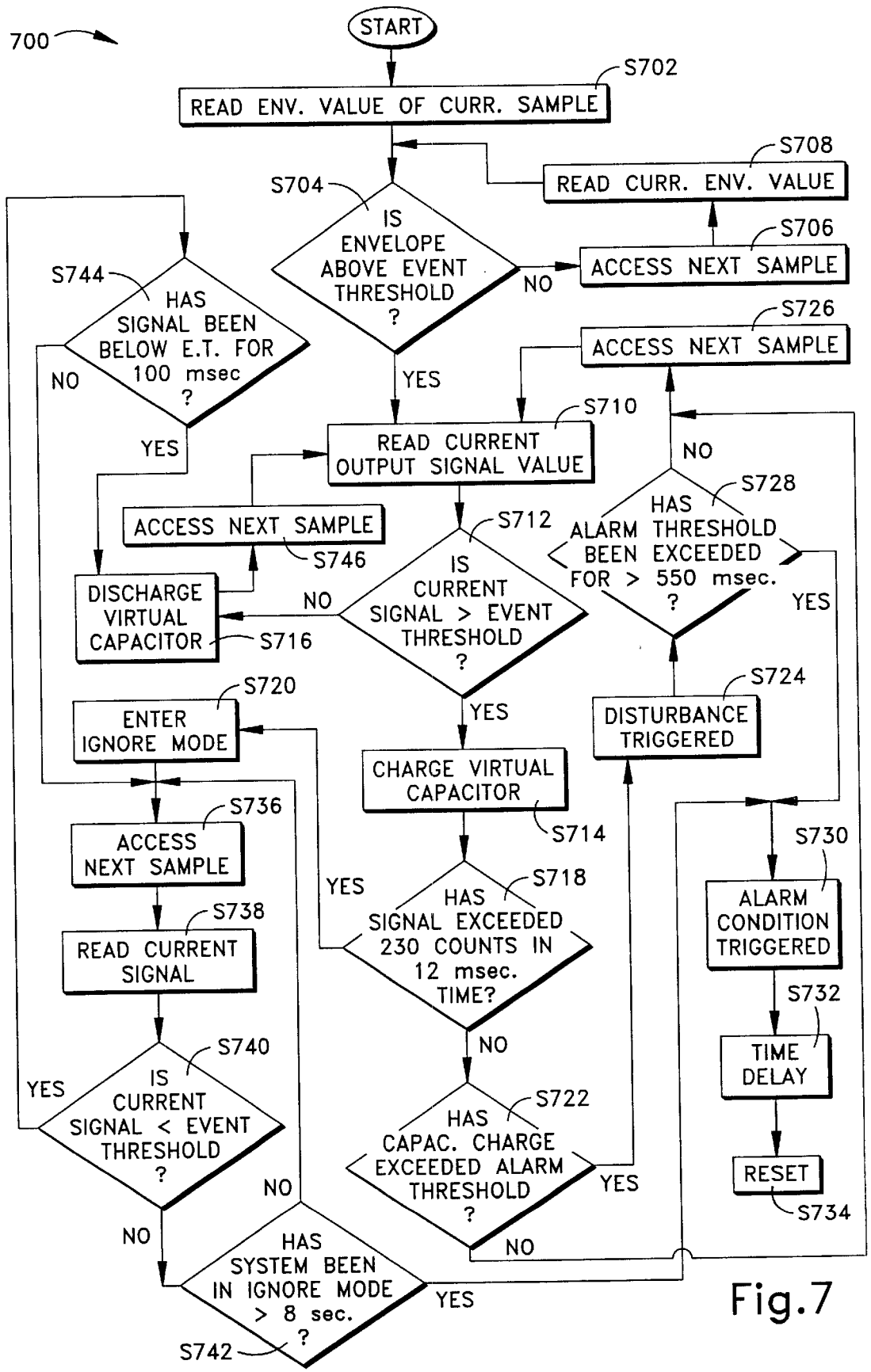
FIG. 7 is a flowchart diagram of a control process for determining whether an alarm condition should be triggered.

FIG. 7 illustrates the control process 700 for determining whether the output signal is indicative of an intrusion and whether or not to trigger an alarm condition. The process 700 begins at step S702 where the envelope value for the current sample is read. At step S704, a determination is made as to whether the current envelope value is above the event threshold. If the determination in step S704 is negative, the process 700 proceeds to step S706. At step S706, the next sample of the envelope is accessed and is made the current sample. At step S708, the new current envelope value is read. The process 700 then returns to step S704. Thus, until the current envelope signal value for a sample is greater than the event threshold, the process continues to cycle between steps S704, S706, and S708. A comparator (not shown) may be used to perform step S704. If the controller 42 includes a comparator for performing step S704, a processor 43 for performing the remainder of the control process 700 of FIG. 7 may enter a sleep mode and remain in the sleep mode until the determination in step S704 is affirmative.

If the determination in step S704 is affirmative, the process 700 proceeds to step S710. At step S710, the current output signal value is read. The process 700 then proceeds to step S712. At step S712, a determination is made as to whether the current output signal value is greater than the event threshold. It is noted that the current envelope value may be greater than the event threshold and the current output signal less than the event threshold. This may occur due to an inherent delay caused by filtering. if the current output signal is greater than the event threshold, the process 700 proceeds to step S714. At step S714, the virtual capacitor is charged. If the determination in step S712 is negative, the process 700 proceeds to step S716 and the virtual capacitor is discharged.

Figure 8:
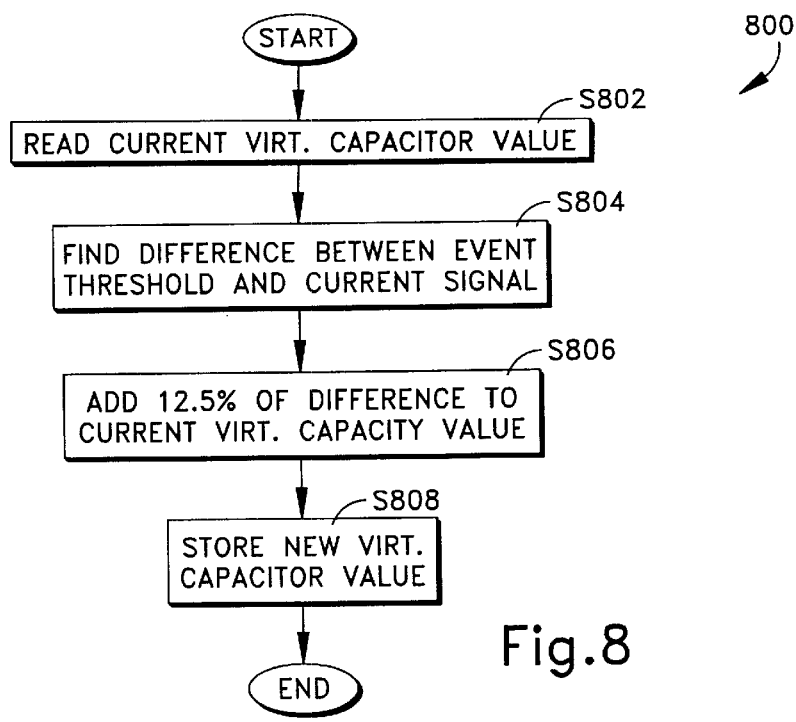
FIG. 8 is a flowchart diagram of a process for charging a virtual capacitor.

The process 800 of charging the virtual capacitor is illustrated in FIG. 8. The process 800 begins at step S802 where a current value of the virtual capacitor is read. The current value of the virtual capacitor is stored in the memory 63 of the controller 42. The default value of the virtual capacitor is zero. The process 800 then proceeds to step S804. At step S804, the difference between the current output signal value and the event threshold is determined. At step S806, a charge is added to the virtual capacitor. The charge is 12.5% of the difference from step S804. The charge is added to the current virtual capacitor value. The process 800 then proceeds to step S808 where the new virtual capacitor value is stored in the memory 63 of the controller 42.

An example of the process 800 of charging the virtual capacitor follows. Assume that the current value of the virtual capacitor is zero, that the current output signal value is 178 counts, and that the event threshold is 154 counts. The charge to be added to the virtual capacitor would be 12.5% of 24 counts (178 counts minus 154 counts). Thus, the charge to be added to the virtual capacitor is 3 counts. Since the current value of the virtual capacitor is zero and a charge of 3 counts is being added to the virtual capacitor, the new virtual capacitor value that is stored in the memory 63 is 3 counts.

Figure 9:
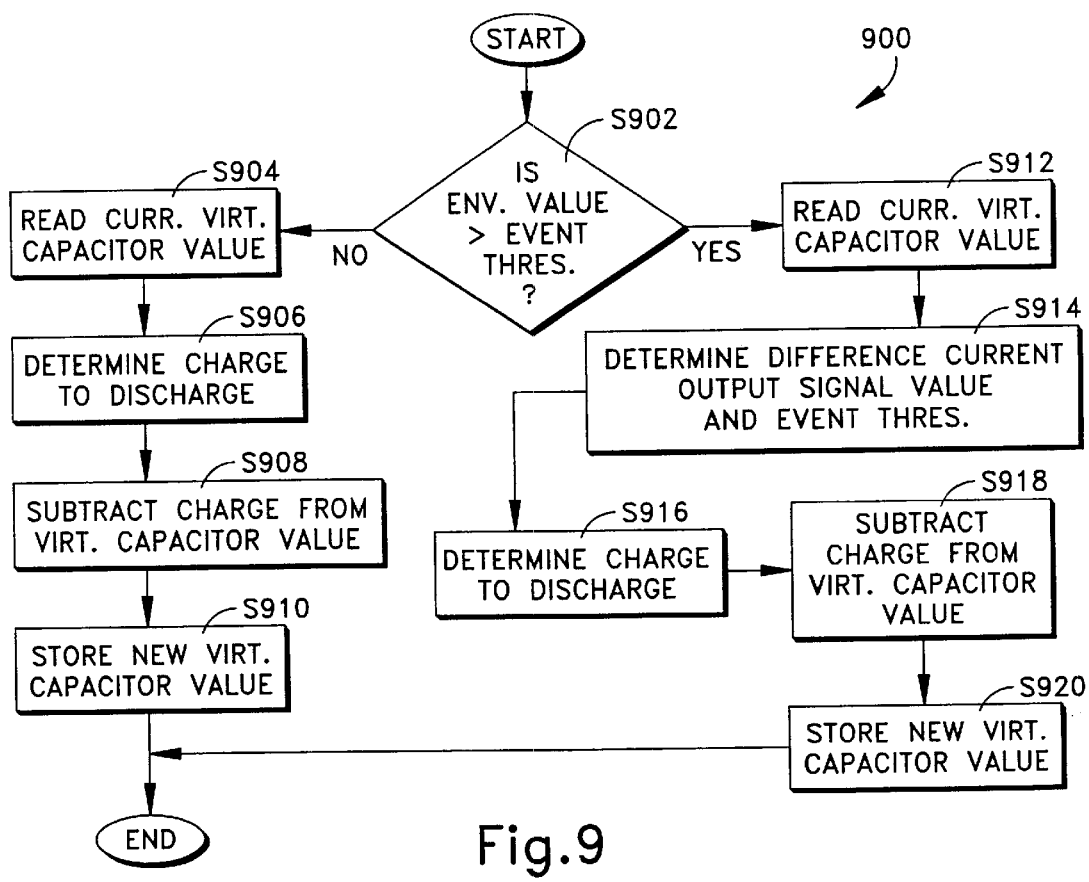
FIG. 9 is a flowchart diagram of a process for discharging a virtual capacitor.
Figure 10:
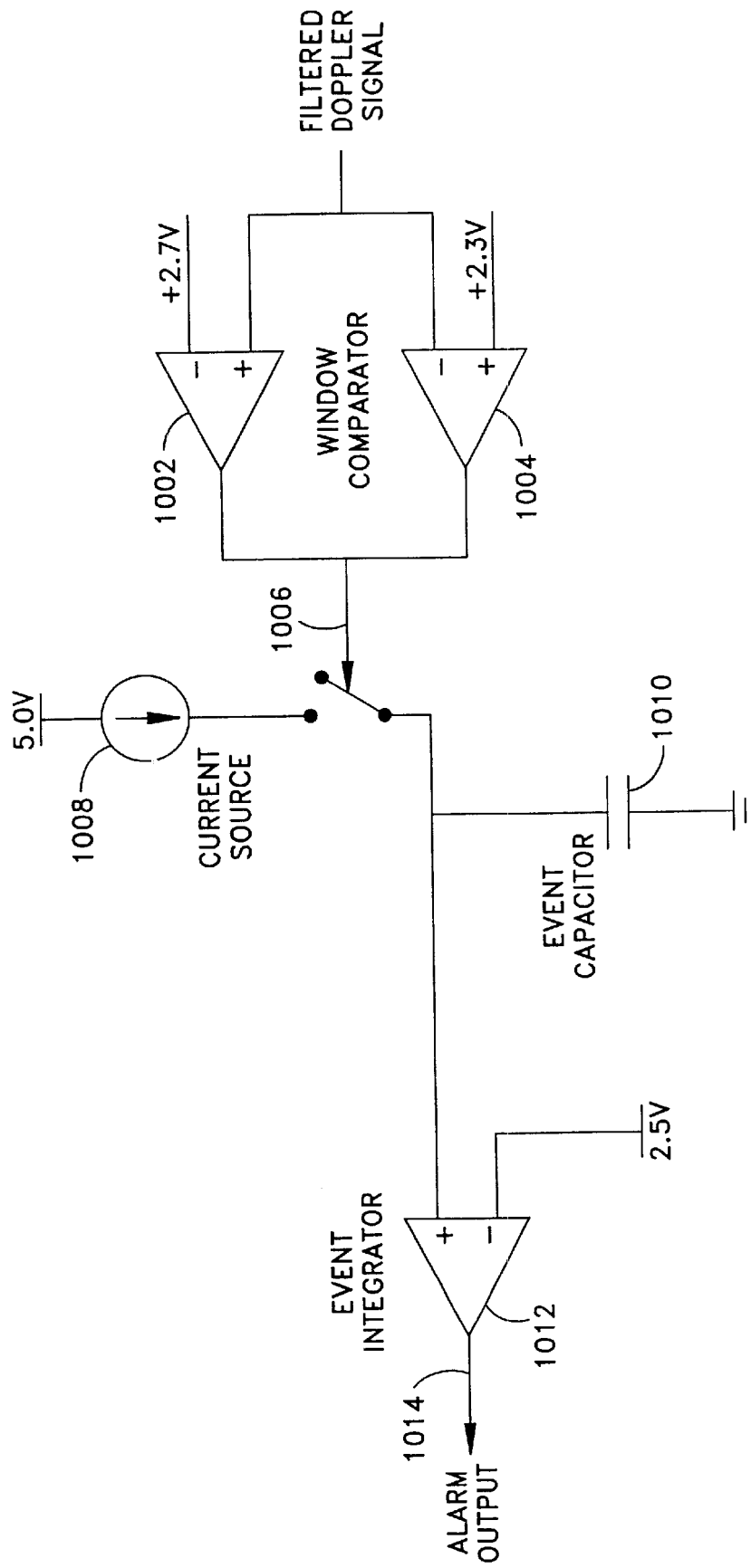
FIG. 10 is a diagram of a known circuit.

The process 900 of discharging the virtual capacitor is illustrated in FIG. 9. The process 900 begins at step S902 where a determination is made as to whether the current envelope value of the sample is greater than the event threshold. If the determination in step S902 is negative, the process 900 proceeds to step S904. At step S904, a current value of the virtual capacitor is read. The process 900 then proceeds to step S906. At step S906, an amount of charge to be discharged from the virtual capacitor value is determined. The discharge value is calculated by determining 50% of the current output signal value. At step S908, the discharge value is subtracted from the current virtual capacity value. The process 900 then proceeds to step S910 where the new virtual capacitor value is stored in the memory 63 of the controller 42.

If the determination in step S902 is affirmative, the process 900 proceeds to step S912. At step S912, the current virtual capacitance value is read. At step S914, the difference between the event threshold and the current output signal value is determined. The process 900 then proceeds to step S916. At step S916, the amount of charge to be discharged from the virtual capacitor value is determined. The discharge value is calculated by multiplying the difference from step S914 by 12.5%. At step S918, the discharge value is subtracted from the current virtual capacity value. The process 900 then proceeds to step S920 where the new virtual capacitor value is stored in the memory 63 of the controller 42.

Two examples of the process 900 of discharging the virtual capacitor follow. Assume that the current value of the virtual capacitor is 110 counts, that the current envelope value is 134 counts, that the current output signal value is 124 counts, and that the event threshold is 150 counts. The value to be discharged from the virtual capacitor would be 50% of 124 counts, which equals 62 counts. Since the current value of the virtual capacitor is 110 counts and a value of 62 counts is being subtracted from the virtual capacitor, the new virtual capacitor value that is stored in the memory 63 is 48 counts.

Now, assume that that the current value of the virtual capacitor is 110 counts, that the current envelope value is 154 counts, that the current output signal value is 124 counts, and that the event threshold is 150 counts. The value to be discharged from the virtual capacitor would be 12.5% of 26 counts (150 counts minus 124 counts). Thus, the discharge value will be 3 counts. Since the current value of the virtual capacitor is 110 counts and a value of 3 counts is being subtracted from the virtual capacitor, the new virtual capacitor value is 107 counts.

By discharging the virtual capacitor at a greater rate when the envelope value is below the event threshold, a charge on the virtual capacitor is removed quickly when a disturbance is removed from the output signal. By quickly decreasing the value of the virtual capacitor when a disturbance is removed, false alarms are avoided. However, when the envelope value remains above the event threshold and the current output value is below the event threshold, the disturbance is likely not removed from the output signal. As a result, the virtual capacitor is discharged at a slower rate so that motion indicative of an intrusion will be properly monitored.

With reference again to the control process 700 of FIG. 7, the process 700 proceeds from step S714 to step S718. At step S718, a determination is made as to whether the current output signal value has exceeded 230 counts (the equivalent of approximately 4.5 volts) for a twelve milliseconds debounce period. A twelve millisecond debounce period means continuously over a twelve millisecond period. If one sample has a value that is below 230 counts during the twelve millisecond period, the debounce timer is reset. When the current output signal value is above 230 counts for the twelve millisecond debounce period, the signal is considered to be "railed." If the signal is not "railed" within 180 milliseconds of the process 700 entering step S710, the determination in step S718 is negative. If the determination in step S718 is affirmative and the signal is "railed" within 180 milliseconds, the process 700 enters an ignore mode, at step S720. If the determination in step S718 is negative, the process 700 enters a motion detection mode and proceeds to step S722.

At step S722, a determination is made as to whether the capacitor value exceeds an alarm threshold. The alarm threshold is preferably 128 counts, the equivalent of 2.5 volts. If the determination in step S722 is affirmative, the process 700 proceeds to step S724. If the determination in step S722 is negative the process 700 proceeds to step S726.

At step S726, the next sample of the output signal is accessed by increasing the current sample by one sample. The process 700 then returns to step S710 and the process 700 is repeated with the next sample now being the current sample.

At step S724, the controller 42 triggers a disturbance flag. The process 700 then proceeds to step S728. At step S728, a determination is made as to whether the capacitor value has exceeded the alarm threshold for a debounce period of greater than 550 milliseconds. Again, the debounce period is a period of 550 consecutive milliseconds. If the capacitor value falls below the alarm threshold, even for one sample, during the 550 milliseconds, the determination in step S728 is negative. If the determination in step S728 is negative, the process proceeds to step S726. If the determination in step S728 is affirmative, the process 700 proceeds to step S730 and an alarm condition is triggered. From step S730, the process 700 proceeds to step S732. At step S732, a time delay occurs. After the time delay, the process 700 proceeds to step S734 and the process 700 is reset.

If the process 700 enters the ignore mode at step S720, the process 700 then proceeds to step S736. At step S736, the next sample of the output signal is accessed by increasing the current sample by one sample. The process 700 then proceeds to step S738 where the value of the next sample, now the current sample is read. From step S738, the process 700 proceeds to step S740. At step S740, a determination is made as to whether the current signal is below the event threshold. If the determination from step S740 is negative, the process 700 proceeds to step S742. If the determination from step S740 is affirmative, the process 700 proceeds to step S744.

At step S744, a determination is made as to whether the current signal value has been below the event threshold for 100 milliseconds. If the determination in step S744 is affirmative, the process 700 proceeds to step S716 and the virtual capacitor is discharged. If the determination in step S744 is negative, the process 700 returns to step S736.

At step S742, a determination is made as to whether the system has been in the ignore mode for a debounce period of eight consecutive seconds. If the determination in step S742 is affirmative, the process 700 proceeds to step S730 and an alarm condition is triggered. If the determination in step S728 is negative, the process 700 proceeds to returns to step S736.

If the virtual capacitor is discharged at step S716, the process 700 proceeds to step S746. At step S746, the next sample is accessed by increasing the current sample by one sample. The process 700 then returns to step S710 where the process 700 is repeated with the next sample now being the current sample.

The control process 700 of FIG. 7 continues until either an alarm condition is triggered or until the virtual capacitor value is zero for a predetermined period, for example a debounce period of 3 consecutive seconds. If the virtual capacitor value is zero for the predetermined period, the control process 700 of FIG. 7 is terminated and a new process 700 beginning at step S702 begins.

Empirical data has shown that thumps on a vehicle 16 that may cause false alarms generally have a high energy and a short duration. Typically, for a thump on a vehicle 16, the time between the rise of the output signal above the event threshold and the decay of the output signal below the event threshold is less than 250 milliseconds. Empirical data has also shown that motion indicative of an intrusion usually has lower energy for a long duration. Typically, the output signal for an intrusion has an amplitude above the event threshold for a time period of greater than 250 milliseconds.

As is evident from the above description of the control process 700 of FIG. 7, an alarm condition is not triggered unless the signal is "railed" for a debounce period of eight seconds or the virtual capacitor value has exceeded the alarm threshold for a debounce period of 550 milliseconds. These criteria eliminated the occurrences of false alarms. When processed through the control process 700 of FIG. 7, a thump on the vehicle 16 will most likely cause the output signal to become "railed" so that the process 700 enters the ignore mode. Since the duration of a thump is generally short, an alarm condition will not be triggered. Even if the thump does not cause the process 700 to enter the ignore mode, the thump will not trigger an alarm condition unless the thump causes the virtual capacitor value to exceed the alarm threshold for greater than 550 consecutive milliseconds.

Motion within the passenger compartment 14 of the vehicle 16 generally will not cause the signal to become "railed." Thus, the control process 700 of FIG. 7 generally will not enter the ignore mode in response to such motion. Since motion within the passenger compartment 14 generally has a long duration, the motion will most likely cause the virtual capacitor value to exceed the alarm threshold for the 550 consecutive milliseconds necessary for an alarm condition to be triggered. Thus, the control process 700 of the apparatus 10 of the present invention reduces false alarm while being sensitive to motion indicative of an intrusion.

Although the foregoing description has specifically applied the apparatus of the present invention to detecting an intrusion into the passenger compartment 14 of a vehicle 16, the apparatus 10 may be used to detect an intrusion into any predefined area.

From the above description of the invention, those skilled in the art will perceive improvements, changes and modifications. For example, the percentages used in charging and discharging the virtual capacitor may be varied. Additionally, the default event threshold, the alarm threshold, and each of the debounce time periods may be changed. Such improvements, changes and modifications within the skill of the art are intended to be covered by the appended claims.

Having described the invention, I claim the following:

1. An apparatus for detecting an intrusion into an area, the apparatus comprising:
    a transmitter for transmitting a signal within the area;
    a receiver for receiving reflected return signals of the transmitted signal and for generating an output signal indicative of the reflected return signals received; and
    a controller for analyzing the output signal, the controller including a processor for running an algorithm that simulates performance of a capacitor, which charges and discharges in response to an output signal, by increasing a virtual capacitor value when the output signal is greater than a threshold and by decreasing the virtual capacitor value when the output signal is less than the threshold.

2. The apparatus as defined in claim 1 wherein the controller further includes a memory for storing the virtual capacitor value.

3. The apparatus as defined in claim 1 wherein the apparatus further includes a process circuit for filtering and rectifying the output signal.

4. The apparatus as defined in claim 3 wherein the rectifier is a full-wave rectifier that uses the transmitted signal as a reference signal.

5. The apparatus as defined in claim 1 wherein the apparatus includes an envelope detecting circuit for determining an envelope of the output signal.

6. The apparatus as defined in claim 5 wherein the virtual capacitor value is discharged at a different rate when the envelope is above the threshold than when the envelope is below the threshold.

7. The apparatus as defined in claim 1 wherein the threshold is adapted to avoid false alarms that may result from varying environmental conditions.

8. The apparatus as defined in claim 1 wherein a disturbance is triggered if the virtual capacitor value exceeds an alarm threshold.

9. The apparatus as defined in claim 1 wherein an alarm is triggered if the alarm threshold is exceeded for a predetermined period of time.

10. The apparatus as defined in claim 1 wherein the processor includes an ignore mode, an alarm being triggered if the processor enters the ignore mode and remains in the ignore mode for a predetermined period of time.

11. A method for detecting an intrusion into an area, the method comprising the steps of:

transmitting a signal within the area;

receiving reflected return signals of the transmitted signal;

generating an output signal indicative of the reflected return signals received; and running an algorithm that simulates performance of a capacitor, which charges and discharges in response to an output signal, by increasing a virtual capacitor value when the output signal is greater than a threshold and by decreasing the virtual capacitor value when the output signal is less than the threshold.

12. The method as in claim 11 further including the step of:

storing the virtual capacitor value in a memory.

13. The method as in claim 11 further including the steps of:

filtering the output signal; and rectifying the output signal.

14. The method as in claim 13 wherein the step of rectifying the output signal further including the steps of:

filtering the transmitted signal; and using the filtered transmitted signal as a reference signal to full-wave rectify the output signal.

15. The method as in claim 11 further including the step of:

triggering a disturbance if the virtual capacitor value exceeds an alarm threshold.

16. The method as in claim 11 further including the step of:

triggering an alarm if the virtual capacitor value exceeds an alarm threshold for a predetermined period of time.

17. The method as in claim 11 further including the steps of:

entering the ignore mode if the output signal exceeds a predetermined value; and operating in the ignore mode until the output signal is below the threshold for a first period of time; and triggering an alarm if operating in the ignore mode for a second predetermined period of time.

* * * * *